Oct. 18, 1932.   M. MORRISON   1,883,813
MANOMETER
Original Filed Oct. 8, 1923   3 Sheets-Sheet 1
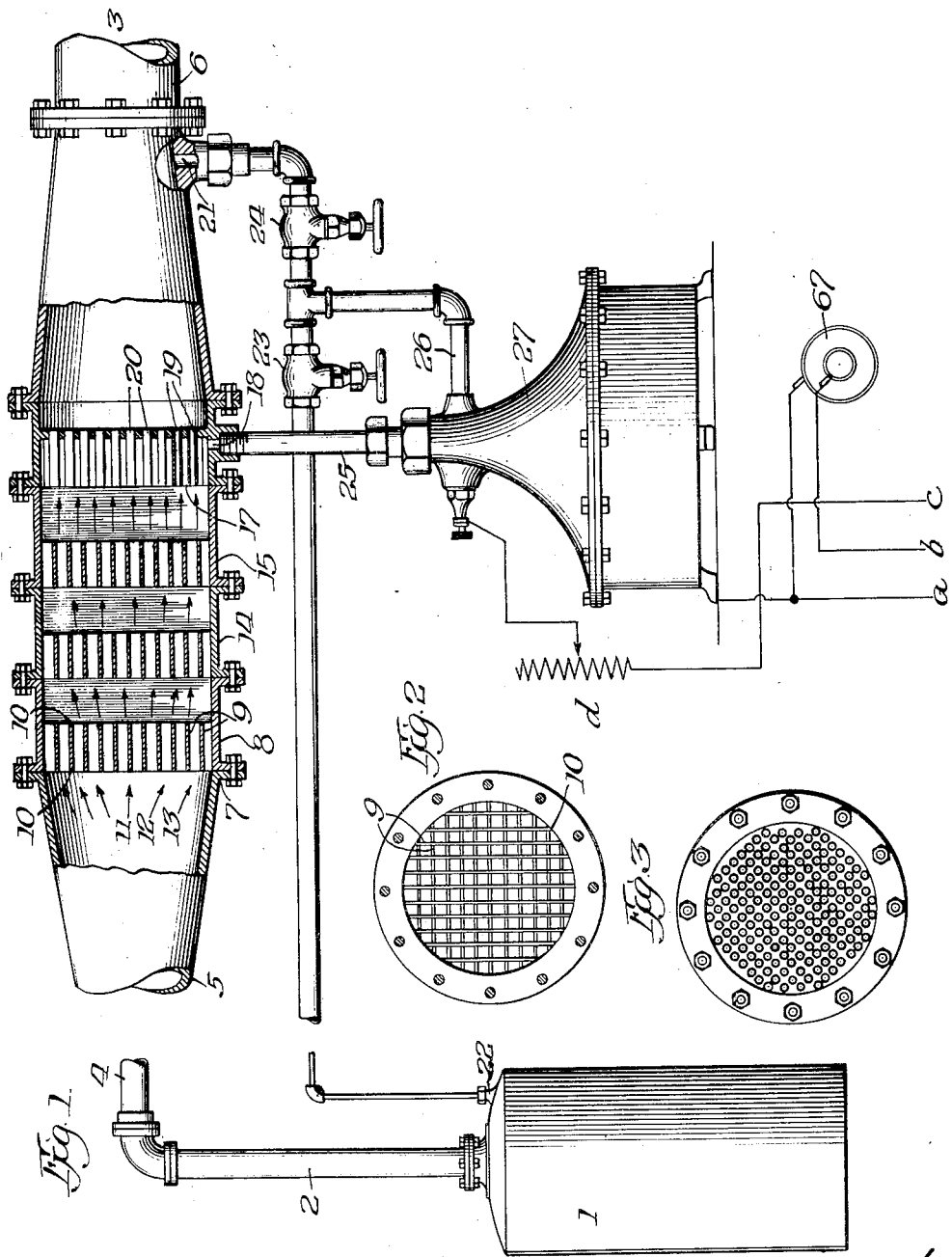

Oct. 18, 1932.   M. MORRISON   1,883,813
MANOMETER
Original Filed Oct. 8, 1923   3 Sheets-Sheet 2
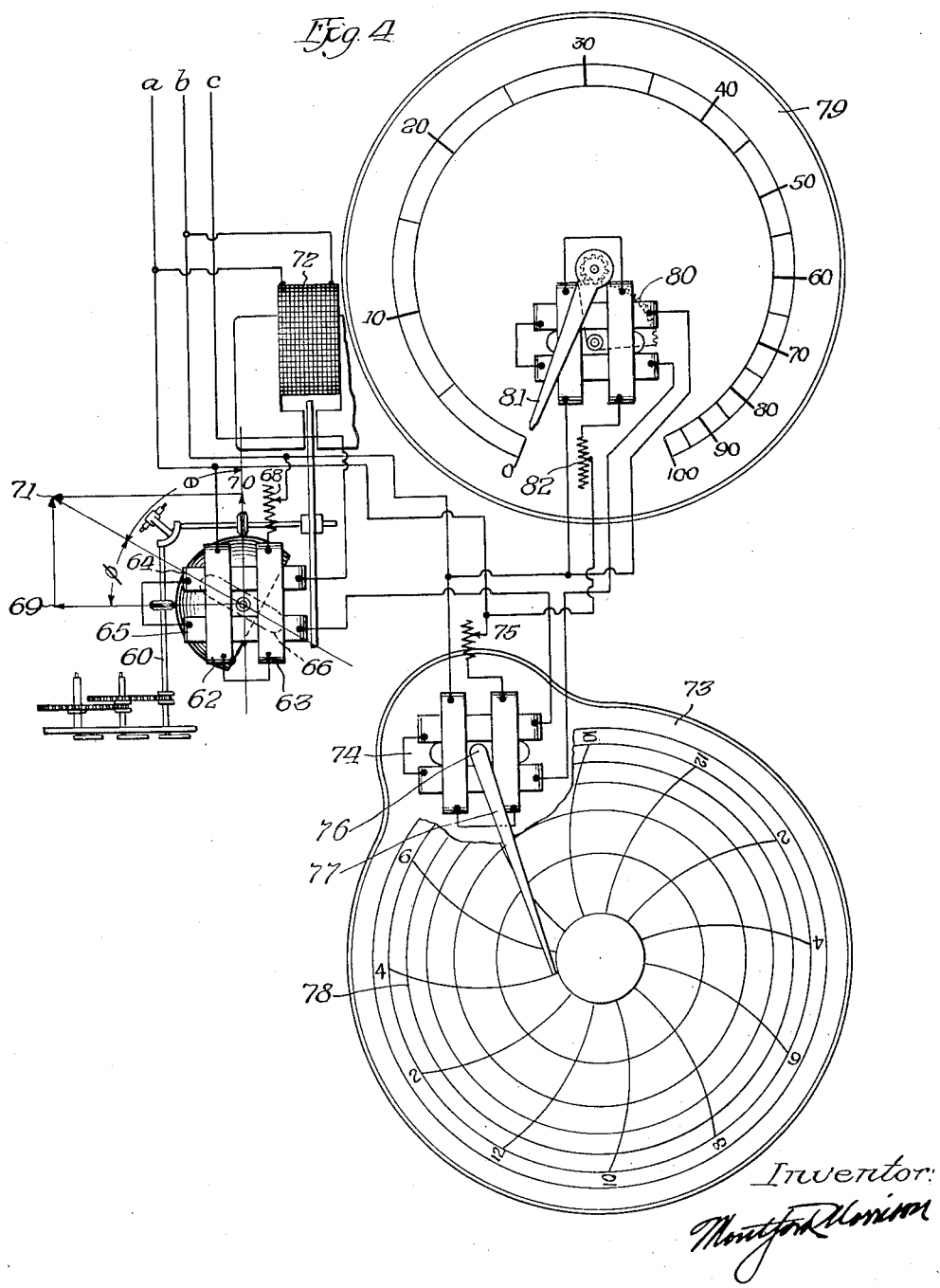

Oct. 18, 1932.  M. MORRISON  1,883,813
MANOMETER
Original Filed Oct. 8, 1923   3 Sheets-Sheet 3
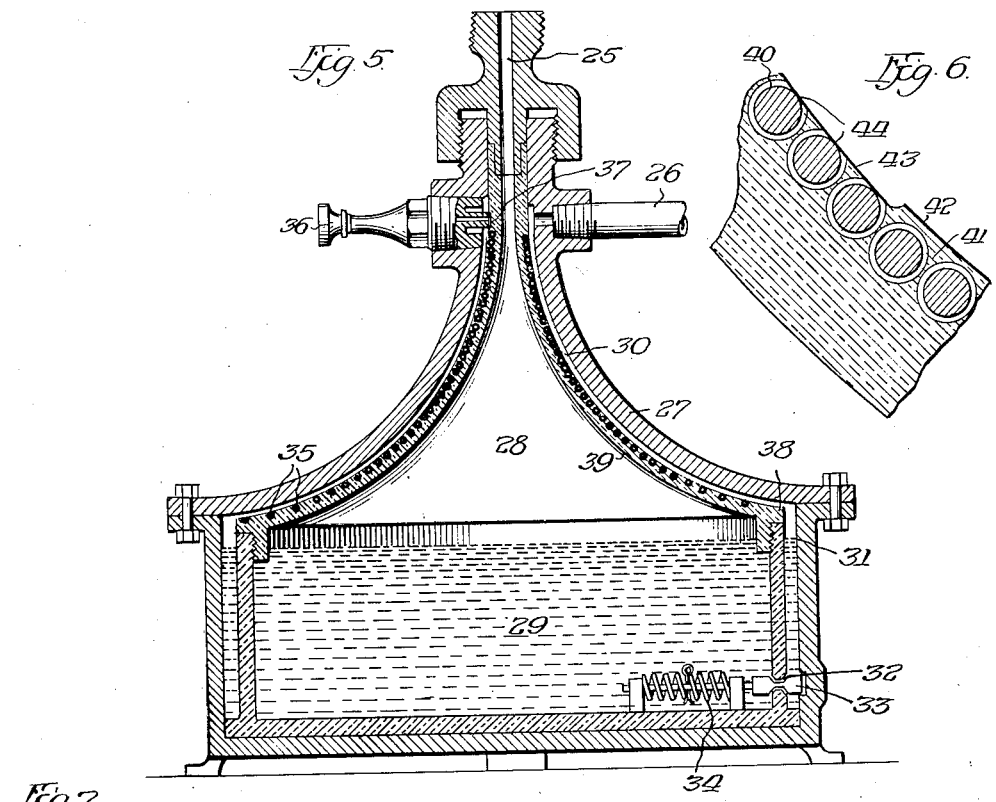
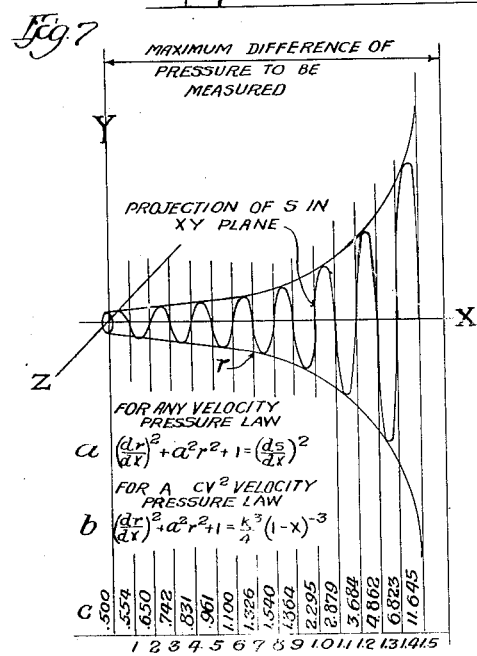
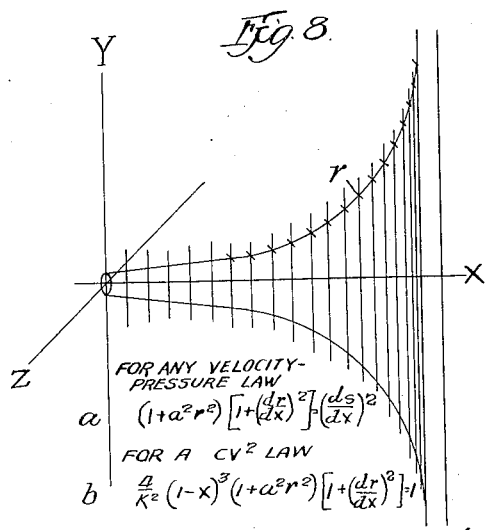
Inventor:
Montfort Morrison Patented Oct. 18, 1932

1,883,813

UNITED STATES PATENT OFFICE

MONTFORD MORRISON, OF MONTCLAIR, NEW JERSEY

MANOMETER

Original application filed October 8, 1923, Serial No. 667,397. Divided and this application filed October 22, 1928. Serial No. 314,168.

This application is a division of my prior application Serial Number 667,397 filed October 8, 1923, now issued as Patent Number 1,759,239, May 20, 1930.

This invention relates to instruments for integrating, recording and indicating the flow of fluids.

Among the objects of my invention are; to provide a generally improved means of integrating, recording and indicating the measure of the flow of gases and liquids; to provide greater accuracy in the functioning of the several component parts; and to provide greater permanency in the calibration of said several parts.

I provide an improved manometer, among the objects of which are, first, to provide a means for accurate duplicating at a distance the continuity of changes in the manometer measurements instead of approximation by step methods; second, to provide a construction for this means which requires a small fraction of the labor involved in the construction of step methods; third, to provide a means of arresting sudden changes and oscillations in the manometer liquid-columns.

Other and further objects will be in part pointed out and in part obvious in the reading of the specification and upon careful inspection of the drawings but the spirit and substance of my invention is more fully disclosed in the appended claims.

Reference may be now made to the drawings in which, Fig. 1 considered jointly with Fig. 4, constitutes a diagrammatical sketch of one embodiment of my invention and in which the elements have been so modified, rearranged and simplified to general explanatory essentials, as is thought best to clearly present the differentiating characteristics of my invention in such a manner as would enable one skilled in the art to make and use my invention.

Figs. 2 and 3 are details of the embodiments of the velocity modifier and dynamic pressure tubes of Fig. 1.

Fig. 5 is a general cross-section of the manometer shown in elevation in Fig. 1 and Figs. 6, 7 and 8 are construction details of Fig. 5 and will serve to illustrate method of making same.

Reference may be made to the particular embodiment of my invention as illustrated in the drawings, in which Fig. 1, 1 is a gas holder, 2 is a pipe line conducting the gas from the holder to a distant receiver in the general direction of the numeral 3; the pipe line as illustrated is broken at 4, and that part of the line which follows is considerably enlarged for clearness and is illustrated by 5. The relative size of the pipe 4, drawn on an enlarged scale of the same as part 5, would be of the size 6, the flange and an enlargement similar to 6 being eliminated from the left hand side of this figure.

In the figure the flow of gas is from left to right, and into the pipe line, I insert the part 5, which expands into a considerable greater diameter 7. This increase of diameter has the property of decreasing the velocities before they enter my dynamic pressure tubes, and in addition, I may bring the clear sectional area of the parts through which the gas must flow up to, or even greatly in excess of, the cross section of a normal pipe line, thus introducing the possibility of overcompensating for the extra friction introduced by the measuring device.

Also, this provides means for measuring the velocity of flow on a considerably reduced velocity basis, which I find increases the accuracy of a dynamic pressure tube measurement.

Beyond this expanded pipe part 7, on the down stream side of the side part, is the first stage of a velocity modifier 8. Fig. 2 is an elevation of the said part 8, taken from the up stream side thereof. This pressure modifier is of a cellular construction and in the embodiment shown comprises cross-planes 9. Figs. 1 and 2, and these cross-planes may be provided with sharp edges on their up and down stream sides, 10.

In general the area of the combined cells taken as cross sections in the line of flow are in excess of the normal areas of the pipe 4.

It will be appreciated by those skilled in the art that the resistance offered to the flow of fluids in pipes is proportional to some law relating to the velocity of flow, and it can be said, as a general statement, that the resistance offered to the flow of fluids in pipes over a great range of velocities increases faster than does the increase in velocity, and I employ a construction utilizing this principle in the velocity modifier 8.

With reference to the longitudinal velocities in the pipe, independent of turbulency of flow, which phase I will discuss presently, it can be said that the gas in the center of a pipe is moving at a greater velocity than that closer to the walls of the said pipe. With a construction such as illustrated in 8, the resistance of the flow of a fluid is localized, so to speak, so that great local resistance is offered to a high speed stream line at 11, than one at 12, and if the flow at 12 be greater than that at 13, more resistance is offered at 12 than at 13 to the flow, so that the general effect is for the high velocity stream line to tend to flow toward the low velocity stream line, thus having the effect of equalizing the distribution of velocities over the cross section of the pipe. 14 and 15 are second and third stages of the velocity modifiers, and may be similar to stage 8.

It will be appreciated by those skilled in the art that such a construction offers great resistance to the turbulency of flow, and by properly proportioning such stages, the turbulency of flow may be thus greatly reduced.

It will be appreciated that the exact construction illustrated herein does not represent the limiting characteristics of my invention, as I might just as well construct these velocity modifiers all in one piece, with lateral holes connecting the cells, or any construction which localized the resistance to the stream lines of flow, such as to make the local resistance increase with increased velocity, and provide means for assisting in the redistribution of these velocities when the said local resistance is offered to them. Further, in some cases, where the average velocity encountered is very low, I may so construct these velocity modifiers that after reducing the average velocity sufficiently, the diameters in these cells in these velocity modifiers are such that they are below the critical value, as given by Reynolds.

When the stream lines of flow have reached the plane 17, they are in their final modified form, and are ready to be measured upon the dynamic pressure tubes. My dynamic pressure tubes are distributed over substantially the entire cross section and at right angles to the line of flow at plane 17, and in general, are in line with the cells of the velocity modifiers. With a large number of tubes distributed over the entire area and substantially in line with the velocity modifiers described, it will be appreciated that the stream lines are not disturbed materially in their direction and continue through these tubes in their modified form.

Unlike the dynamic pressure tubes of the prior art, I conduct the fluid through the tubes and may have the dynamic pressure tap open substantially within the pipe line itself. It will be apreciated with such a construction that the flow is integrated over the entire cross section, at right angles to the longitudinal direction of flow. Independently of whether great uniformity of velocity is obtained or not, the reading of the dynamic pressure tap is much more accurate than with tubes in the prior art which at the best only take into account openings in a line across the direction of flow. A dynamic pressure tap is shown at 18, and the tubes through which the fluid flows are shown in section 19 and in elevation at 20, and an up-stream elevation of the dynamic pressure tubes is shown in Figure 3, and therein is shown their approximate location and general distribution.

In my invention I have provided two static pressure taps, one at 21 and one at 22. It will be appreciated that the static pressure recorded at tap 21 includes all the drop in head due to that of the entrance of the pipe 22 at the gas holder 1, the friction in the pipe line 2, the loss due to the elbow and various other conditions which may be peculiar to the particular construction of pipe line used, and it is at once apparent that it will be impossible to take similarly calibrated meters and expect them to read correctly on all pipe lines. This explains the apparently heretofore inexplicable reason why similarly calibrated meters should read different on different pipe lines.

I also provide valves 23 and 24, which allow me to utilize either static presure tap I desire. In the utilization of the static pressure tap at 22, or at least one further disposed upstream than tap 21, I eliminate substantially all errors introduced into the instrument due to pipe line losses.

However, I appreciate that it is not always practical or desirable to make a static pressure tap at 22, or even remotely disposed from the dynamic pressure tap along the upstream line of the pipe, and for this reason I have also provided the pressure tap at 21, which is the usual practice. Pipe 25 is the dynamic pressure connection for the manometer 27, and pipe 26 is the static pressure connection for the said manometer. In this description and specification of the instrument, the applicant has purposely omitted some details, such as means for taking care of gas condensation and the like, as such means are not an essential element in this invention. It is believed that such a detail and such similar small details would add nothing of value to the specification.

Referring to Figure 5, I will discuss the principal elements of the manometer 27 of Figure 1. In the embodiment of my manometer invention herein illustrated, I provide a general metal casing 27, which encloses substantially the entire device; 25 is the dynamic pressure inlet, which communicates the said pressure to the chamber 28, which is partly filled with some liquid such as mercury 29. 26 is the static pressure inlet to the manometer, which communicates the said pressure to the space above the mercury level 31. In the case of some fluids to be measured, this space may be filled with an insulating fluid, which protects the electrical elements therein contained and hereinafter described. The mercury level on the static pressure side of the manometer is indicated by the line 31, as before referred to. The communication between dynamic and static pressure chambers is preferably restricted to a small opening, such as indicated at 32. This small opening-construction prevents the mercury from being transferred from one chamber to another with any great degree of rapidity, which has the effect of dampening out oscillations in the differential mercury column, due to pulsations in the flow of the fluid to be measured.

In the opening 32, is located a double acting check valve 33, which is held in a neutral position by means of spring 34, and should there be a tendency for the sudden rise of mercury in either direction through the opening 32, of sufficient magnitude to force the mercury beyond its normal working limit, the double acting check valve 33 closes the opening until pressure has been removed, thus tending to prevent the mercury from being blown out under certain conditions in practice.

In the embodiment, illustrated herein, of manometer, I provide an immersible coil of wire 35, which has its several turns short-circuited by the rise of mercury in the chamber above 31, by the rise in level of mercury or other liquid at 31.

I may provide my manometer with an insulated bushing 36, which serves as an insulated electrical connection from the thumb-nut at 36 to the beginning of the resistance coil 37. The resistance coil beginning at 37 is wound spirally and helically around a surface of revolution according to certain law hereinafter described, and ending at the point 38. My resistance coil is so constructed that as the mercury rises in the chamber 30 due to the differential pressure in the manometer, as the said mercury short circuits the turns in the coil 35, the remaining unshort-circuited turns have an electrical conductivity which, when referred to a standard is proportional to the velocity of flow in the pipe line 4.

Mathematically, there are several ways of arriving at the dimensions of such a coil of wire, and two of which I will explain herewith.

Referring to Figure 7, the maximum pressure difference to be measured is indicated on the diagram by the legend, and it is desired to find the intersection in the $x$—$y$ plane of a surface of revolution, which, when it has a resistance wire wound upon it will give such a length, to any remaining unshort-circuited turns of this electrical conductor, as will allow it the desired conductivity.

Obviously, the pitch of the thread 3, which constitutes the path of the resistance coil, might follow any law whatever, but in order to take advantage of standardization in existing lathes, I may use a constant pitch along the $x$-axis, in which case, I obtain a path for the wire, which when projected in the $x$—$y$ plane, is the curve indicated in the figure for $s$. Curve $r$ is the intersection of a surface of revolution around which thread $s$ is cut. I have solved the problem of deducing the equation for the dimensions of such a coil for any relation whatever between the velocity of flow in the pipe line 4, Fig. 1, and the dynamic pressure in the manometer 27. My result is represented by equation $a$ in Figure 7. As I have heretofore pointed out, this aforementioned relation may be very complicated in form, and therefore I provide a special equation from the solution of which I may obtain desirable values.

When the conditions of flow in the pipe line 4 are such that the square law holds sufficiently true between the velocity of flow and the dynamic pressure, I may use equation $b$, Figure 7, which represents mathematically the relations under these conditions.

I have solved this equation numerically, and print in column $c$ the numerical values of the various ordinates of the curve. It will be appreciated by those skilled in the art that the utilization of a surface of revolutions for this resistance coil is not absolutely essential, to come within the scope of my invention, as the cross section of this coil may have any form whatever, but the surface-of-revolution figure is used because of its constructive simplicity and practical importance.

Referring to Figure 8, it will be observed that instead of using a constant pitch along the $x$-axis, as illustrated in Figure 7, I may use a constant pitch along the intersection of the surface of revolution $r$ in one of the reference planes, as illustrated in Figure 8, by the equally spaced lines along the intersection of the said surface of revolution in the $x$—$y$ plane. Such a construction may prove to be very useful in certain cases, and I therefore give the equation for this form of resistor for any velocity pressure relation and show it on the line $a$ in Figure 8. Line $b$ gives the equation for a square law relation between the aforesaid velocity and pressure.

Regarding some of the practical details in the method of making such a resistance coil which would be operative under the conditions imposed upon it in this invention, refer to Figure 6, which is an enlarged segment of the section at 39.

This spool 39, upon which the resistance coil is wound, has molded or cut into its outer surface an open thread or grove which has for its direction, dimensions, etc., those set forth in the equation given in Fig. 7 or Fig. 8, and into which the resistance wire is to be wound.

It will be appreciated by those skilled in the art, that resistance wire is found to vary in actual resistance from lot to lot, and to take care of this, I select a piece of wire of a length and resistance slightly under that required for the coil. This wire is then grasped at certain places and stretched with a resistance measuring instrument in circuit and the stretching operation is continued until the resistance measuring instrument indicates a certain value, still somewhat less than the ultimate value required.

This resistance wire is composed of any suitable material with a slight coating of varnish insulation, commonly known as enamel by users of resistance wire. The wire is then wound into the thread of the spool, and when wound has a total resistance slightly lower than the ultimate desired value. The spaces 41, Fig. 6 between the wire 40 and the spaces 42 above said wire are completely filled with varnish or other suitable insulation and then fixed into a solid mass by oxidization or some other process, which gives a structure of resistance coil which is entirely embedded within a solid mass of insulating material, giving such an appearance in cross section as the lower part of Fig. 6. The superfluous resistance insulating material is removed from the resistance coil along the line 43, which is comprised of the wire with small flat spots 44 by chucking the said resistance coil in a lathe, revolving it about its axis of revolution and cutting the superfluous material from the outer surface of the said resistance coil by a tool located in the tool post of the said lathe, such as is common practice in the art of handling engine lathes. The actual calibration of the total resistance of the coil is effected by cutting further into the coil along the line 43, making broader surfaces at 44, until the proper exact resistance is obtained, thus providing a resistance coil embedded into a solid mass of mechanically strong insulating material, and calibrated after being wound in place. The removal of the superfluous insulating material is affected by revolving the resistor unit about its axis of revolution, in an engine lathe for instance, and "take a cut" across the outer surface of the resistor element, tool mark producing a cut like that shown at 43.

The wires having only small surfaces exposed at 44 to the action of the mercury, entirely eliminate the short-circuiting of a turn due to the mercury otherwise adhering in the spaces between them, as has been experienced in the prior art.

The operation of the present embodiment of my invention can be appreciated by those skilled in the art by reference to the following:

Source of potential, 67, Fig. 1, supplies energy for exciting the three instruments of Fig. 4. Through conductors $a$ and $b$, Figs. 1 and 2, is obtained current for the coils 62 and 63, which current is limited only by the resistance of the circuit and substantially only by the variable resistance 68, Fig. 4, so that the field strength of the coils 62 and 63 is a function of the conductivity of the resistance 68 and the voltage of the potential source 67. I may speak of this field as a shunt field, and as will be shown presently, coils 64 and 65 are series fields. As will be observed from Figs. 1 and 4, coils 64 and 65 are connected in series with the other two instruments shown in Fig. 4, with the resistor of the manometer 27 and this variable resistance $d$ of Fig. 1 in circuit.

When potential source 67 generates voltage, shunt coils 62 and 63 produce a strong field at right angles to the direction of their windings, which is in the direction of the arrow 69, Fig. 4. Armature at 66 assumes a position such that its largest dimension lies in the direction of the arrow 69.

As the flow of gas impinges upon the dynamic pressure tube 17 in Fig. 1, the mercury level at 31 in Fig. 4 rises in the chamber 30, the mercury coming into contact with the wire at 38 and at 35 and the like, causes current to flow in the line $c$, exciting the series coils 64 and 65 of Fig. 4. This creates a field at right angles to 69 and in the direction 70. The shunt and series fields combining vectorially, and give the resultant field 71, and because of the relatively greater permeability of the armature in the direction of its major axis, the armature assumes the direction of the arrow 71.

If the voltage of the potential source 67 raises, lowers, alters its frequency, wave shape or constancy, the relative intensity of the shunt and series fields are unaltered, so long as the shunt and series circuits have substantially similar characteristics, and therefore the angle phi does not change; even if the voltage of the potential source 67 be practically removed, the position of this angle remains unchanged. However, of course, in the absence of a magnetic field about the armature at 66, it lacks stability of position.

It may be well to point out here that there is no requirement that the potenial source 67 be one of an alternating current, although it is diagrammatically shown as such. For the sake of simplicity I have shown the motive power for the timing element to be a phase shifting induction motor, such as used in watt-meters, and the like, and designated by 72, Fig. 4, and supplied with operating energy from the leads $a$ and $b$.

The usefulness of the variable resistance 68 is extensive in the operation of the instrument, as it may originally serve as a calibrating resistance, and further, by the variation of this resistance, either manually or automatically, the instrument may be compensated for any desirable effect such as change in densities, pressure, temperature and the like.

Fig. 4, 73 is a graphic meter, which I utilize the tangent principle of the integrator just described. The electrical element 74 of the graphic meter 73 is exactly similar to the field and armature of the above described integrator, as shown in Fig. 4, and Fig. 10, the shunt fields of 74 being connected in parallel to the shunt fields of the integrator, and the series fields being connected in a series with the series fields of the said integrator. The shunt field of the graphic meter 73 is provided with a separate calibrating shunt 75, which means that it may be calibrated or compensated independent of any other instrument. Onto the shaft 76 of the element 74 is mounted a common form of an arm and stylus 77, the deflections of which describe upon the chart 78 graphically the changes in position of the stylus actuated by its motor element, as is common practice, and as will be appreciated by those skilled in the art. The chart 78 may be driven by any constant speed device.

79 is an indicator, which has an electrical element 80, exactly similar to that of the graphic meter 73, but in addition may have its pointer 81 geared to the armature of the said meter element in order to give it a greater spread of scale and a scale type more familiar in the art of steam measurement.

As will be observed, the divisions on this scale are proportional to the tangent of the angle, which gives a spread of scale at its beginning, permitting of better accuracy at lower readings, due to not only the visibility of the scale but also to the influence of errors at weaker field positions.

However, it will be appreciated that this type of meter element may have a very intense field, and in general, at even the zero position of the pointer. Thus it may not be subjected to such gross errors as are found in square law instruments. It will also be noted that there are no springs required in the operation of either one of the three instruments illustrated in Fig. 4, and thus they are not subjected to the large errors due to the effect of temperature on the springs, nor do they suffer the loss of calibration due to changes in the springs. The meter element 80 is similarly connected to that of the instrument 73. The shunt coil is connected in shunt with the other shunt coils of the flow meter, and the series coils in series with the other series coils of the flow meter. Element 80 is provided with a separate shunt calibrating resistance 82 for the same purposes heretofore set forth for the shunt calibrating resistances of the other instrument.

It will be appreciated by those skilled in the art that the reading of the integrator of Fig. 4 really is effected by a construction such that the speed of the shaft 60 Fig. 4, is fixed by the relative conductivity of two circuits, or the comparison of two resistances by a deflection method.

I claim:

1. In a flow-meter, a differential pressure manometer comprising an integral electric circuit element, having continuous conductance values directly proportional to the flow to be measured, flow-being-measured-actuated means for causing infinitesimal variations in the electric current of said element, and a measurement translating device connected to said manometer.

2. In a flow-meter, a differential pressure manometer comprising an integral electric circuit element, flow-being-measured-actuated means for short-circuiting infinitesimal portions of said element such that the remaining unshort-circuited portion has an electrical conductivity directly proportional to the relation set forth in the equation $$\left(\frac{dr}{dx}\right)^2 + a^2r^2 + 1 = \left(\frac{ds}{dx}\right)^2,$$

and a measurement translating device connected to said manometer.

MONTFORD MORRISON.